(12) United States Patent  (10) Patent No.: US 8,402,740 B2
Guemmer  (45) Date of Patent: Mar. 26, 2013

(54) AIRCRAFT PROPULSION UNIT IN MULTI-FAN DESIGN

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 732 days.

(21) Appl. No.: 12/379,787

(22) Filed: Feb. 27, 2009

(65) Prior Publication Data

US 2009/0229243 A1 Sep. 17, 2009

(30) Foreign Application Priority Data

Feb. 28, 2008 (DE) .......... 10 2008 011 643

(51) Int. Cl.
*F02K 3/02* (2006.01)
*F02K 3/00* (2006.01)
*B64D 27/00* (2006.01)
*B64D 35/00* (2006.01)

(52) U.S. Cl. ............. 60/226.1; 60/224; 60/262; 60/268; 60/269; 244/53 R; 244/55; 244/60

(58) Field of Classification Search ............... 60/226.1, 60/262, 268, 269, 263, 39.15, 254, 226.3; 244/55, 53 B, 53 R, 54, 60
See application file for complete search history.

(56) References Cited

U.S. PATENT DOCUMENTS

| 2,025,033 | A | | 12/1935 | Atwood |
| 2,601,194 | A | | 6/1952 | Whittle |
| 2,988,301 | A | | 6/1961 | Fletcher |
| 3,054,577 | A | * | 9/1962 | Erich et al. .......... 60/226.1 |
| 3,179,354 | A | | 4/1965 | Alvarez-Calderon |
| 3,547,380 | A | | 12/1970 | Kappus et al. |
| 3,938,328 | A | * | 2/1976 | Klees .......... 60/262 |
| 4,254,619 | A | * | 3/1981 | Giffin et al. .......... 60/226.1 |
| 4,456,204 | A | | 6/1984 | Hapke |
| 4,500,055 | A | | 2/1985 | Krojer |
| 6,260,800 | B1 | * | 7/2001 | Snell .......... 244/53 R |
| H0002032 | H | * | 7/2002 | DiPietro, Jr. .......... 60/226.1 |
| 6,477,829 | B1 | | 11/2002 | Hunter et al. |
| 6,792,745 | B2 | * | 9/2004 | Wojciechowski .......... 60/224 |
| 7,107,755 | B2 | | 9/2006 | El Hamel et al. |

(Continued)

FOREIGN PATENT DOCUMENTS

| DD | 23971 | 7/1959 |
| DE | 722883 | 7/1942 |

(Continued)

OTHER PUBLICATIONS

German Search Report dated Mar. 10, 2009 from counterpart German patent application.

(Continued)

*Primary Examiner* — William H Rodriguez
*Assistant Examiner* — Carlos A Rivera
(74) *Attorney, Agent, or Firm* — Timothy J. Klima; Shuttleworth & Ingersoll, PLC (57) ABSTRACT

An aircraft propulsion unit includes a gas-turbine core engine 10 having at least one compressor, one combustion chamber and one turbine driving a main shaft 11. The main shaft 11 of the gas-turbine core engine 10 is operationally connected to at least two separate fans 6-9 via a mechanical drive connection, each of them being arranged beside the gas-turbine core engine 10.

19 Claims, 9 Drawing Sheets

U.S. PATENT DOCUMENTS

| | | | |
|---|---|---|---|
| 7,107,756 B2 * | 9/2006 | Rolt | 60/224 |
| 7,540,450 B2 * | 6/2009 | Brand et al. | 244/54 |
| 7,581,694 B2 | 9/2009 | Guering | |
| 7,752,834 B2 * | 7/2010 | Addis | 60/224 |
| 7,819,358 B2 | 10/2010 | Belleville | |
| 7,874,513 B1 | 1/2011 | Smith | |
| 7,926,760 B2 | 4/2011 | Gall et al. | |
| 8,011,613 B2 | 9/2011 | Belleville | |
| 8,015,796 B2 * | 9/2011 | Babu et al. | 60/226.1 |
| 2004/0025493 A1 * | 2/2004 | Wojciechowski | 60/224 |
| 2006/0011780 A1 | 1/2006 | Brand et al. | |
| 2007/0051091 A1 | 3/2007 | Rolt | |

FOREIGN PATENT DOCUMENTS

| | | |
|---|---|---|
| DE | 1264159 | 3/1968 |
| DE | 2831802 | 2/1979 |
| DE | 3291159 | 11/1983 |
| DE | 19840711 | 6/1999 |
| DE | 29916203 | 10/2000 |
| DE | 60206696 | 7/2006 |
| EP | 1331386 | 7/2003 |
| EP | 1637725 | 3/2006 |
| EP | 1916406 | 4/2008 |
| GB | 1249155 | 10/1971 |
| GB | 1554962 | 10/1979 |
| GB | 2356224 | 5/2001 |

OTHER PUBLICATIONS

European Search Report dated May 2, 2012 from counterpart patent application.

German Search Report dated Dec. 23, 2008 from related German patent application.

* cited by examiner

AIRCRAFT PROPULSION UNIT IN MULTI-FAN DESIGN

This application claims priority to German Patent Application DE102008011643.2 filed Feb. 28, 2008, the entirety of which is incorporated by reference herein.

The present invention relates to an aircraft propulsion unit.

More particularly, the present invention relates to an aircraft propulsion unit with a gas-turbine core engine having at least one compressor, one combustion chamber and one turbine driving a main shaft.

Aircraft engines according to the state of the art have an essentially circular frontal outline. The circular outline reflects the concentric arrangement of the engine components, the concentric arrangement of the shafts employed and the use of only one fan or propeller. On customary fan engines, the low-pressure shaft, through which the fan is driven by the turbine, and the high-pressure shaft of the core engine (high-pressure compressor, combustion chamber, high-pressure turbine) are accordingly located in the same rotary axis.

Fan engines according to the state of the art have only one fan module whose diameter was continuously increased in the past in quest of improving the bypass ratio and, thus, propulsive efficiency.

With conventionally designed fan engines, still larger bypass ratios will hardly be achievable. Moreover, the outer diameter of the fan engine will exceed the limits up to which installation of the engine under the wing, as preferred by the aircraft manufacturers, would still be permissible (see FIG. 1, top).

As is known, the limitations of bypass ratio and under-wing installation can be avoided with propeller engines, but these will also quickly exceed favorably installable diameters (see FIG. 1, bottom) and, furthermore, produce strong noise.

Summarizing then, the outer dimensions of the engine configurations according to the state of the art disadvantageously have reached the limit of implementability and on-aircraft installability, in particular with regard to the yaw axis. An increase of the by-pass ratio, which is essentially co-determinant for fuel consumption, is therefore not achievable with designs according to the state of the art.

Specification DE-AS 1 264 159 discloses a thrust unit with at least two gas generators and one or several fans. Part of the exhaust gases of the at least two gas generators is used to drive the fans. The individual gas generators can be operated separately to set the thrust values and the specific fuel consumption.

It is a broad aspect of the present invention to provide an aircraft engine of the type specified at the beginning, which enables a substantial reduction of the fuel consumption to be achieved while avoiding the disadvantages of the state of the art.

More particularly, the present invention accordingly relates to an aircraft propulsion unit in multi-fan configuration which, while maintaining dimensions favorable for aircraft, enables a highly increased by-pass ratio to be achieved and is essentially characterized in that:

the required power is produced by a single gas-turbine core engine having at least one high-pressure compressor, one combustion chamber and one high-pressure turbine and the power is provided at one end of the gas-turbine core engine via a rotating main shaft, the power provided at the main shaft is split by a gearbox to at least two auxiliary shafts, with partial power being transmitted by each of the auxiliary shafts via a further gearbox to the shaft of a fan unit of the shrouded type, the at least two fan units and the gas-turbine core engine are joined to each other by a one-piece or multiple-piece common frame structure, thus forming a compact aircraft propulsion unit, which each fan unit having at least one row of rotor blades or also at least two counter-rotating rotor blade rows and being of single-flow or also multi-flow configuration, the multi-fan aircraft propulsion unit, owing to its design, is installable on the aircraft without extensive integration into the wing or the fuselage, the air for the gas-turbine core engine is either supplied via an external ram inlet arranged between the fan units or is tapped downstream of a rotor or stator blade row via an opening on the flow path at the flow path outer periphery or on elements arranged in the flow path, such as stator blades or struts, of at least one fan unit and fed via a curved duct, the airflow, upon passing a fan unit, gets to the environment via a separate nozzle essentially concentric with the fan axis, or the exit airflows of the fan units are surroundingly passed along the gas-turbine core engine in a common flow path or also separated by walls and are united with the hot-gas flow, the rotary axes of the fan units are essentially equidistantly offset from the rotary axis of the gas-turbine core engine, in configuration as twin-fan aircraft propulsion unit, the rotational centers of the fan units and of the gas-turbine core engine form a straight line.

The present invention is more fully described in light of the accompanying drawings showing preferred embodiments. In the drawings.

Figure 1:
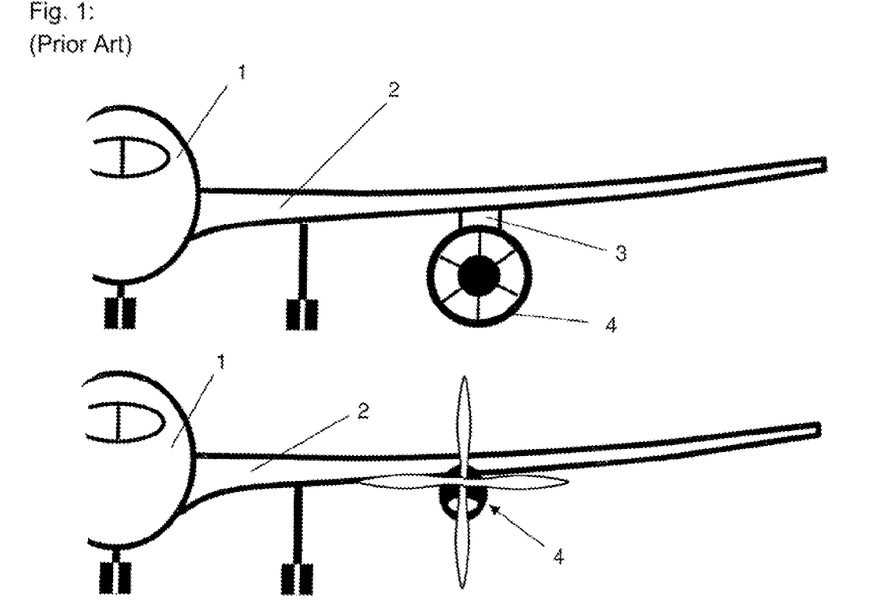
FIG. 1 shows aircraft propulsion units in accordance with the state of the art.

FIG. 1 shows the state of the art in which, on the aircraft fuselage 1, a wing is arranged in the usual manner which, via a pylon, carries an engine 4. The engine may be a fan engine or a turboprop engine.

Figure 2A:
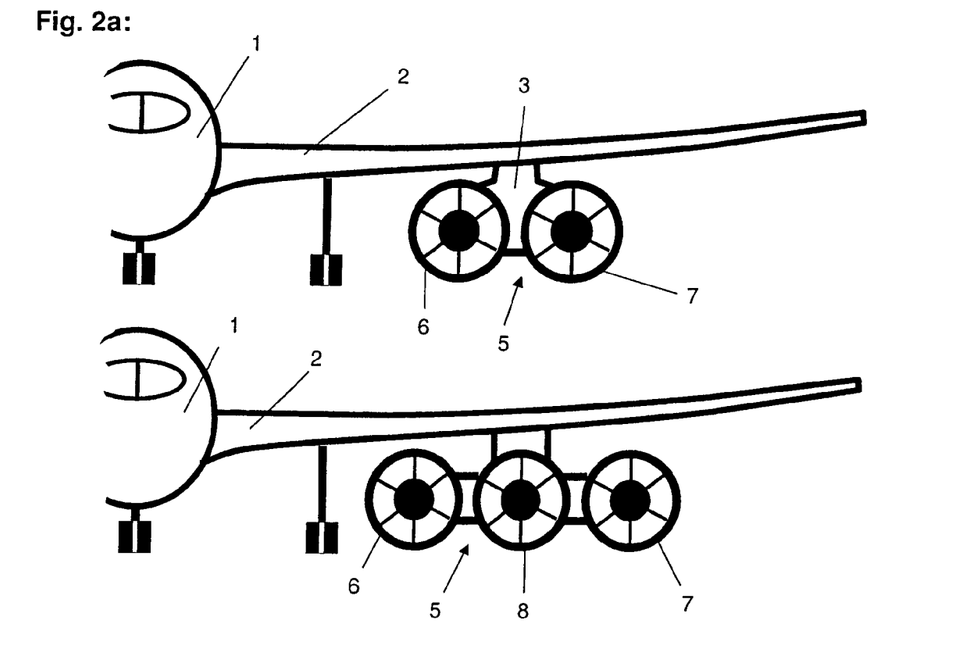
FIG. 2a shows aircraft propulsion units in accordance with the present invention.

FIG. 2a, top, shows the right-hand half of an aircraft with an aircraft propulsion unit with a core engine 10 and two fan units or fans 6, 7 according to the present invention being arranged under the wing.

FIG. 2a, bottom, shows the right-hand half of an aircraft with an aircraft propulsion unit with a core engine 10 and three fan units or fans 6, 7, 8 according to the present invention being arranged under the wing.

Figure 2B:
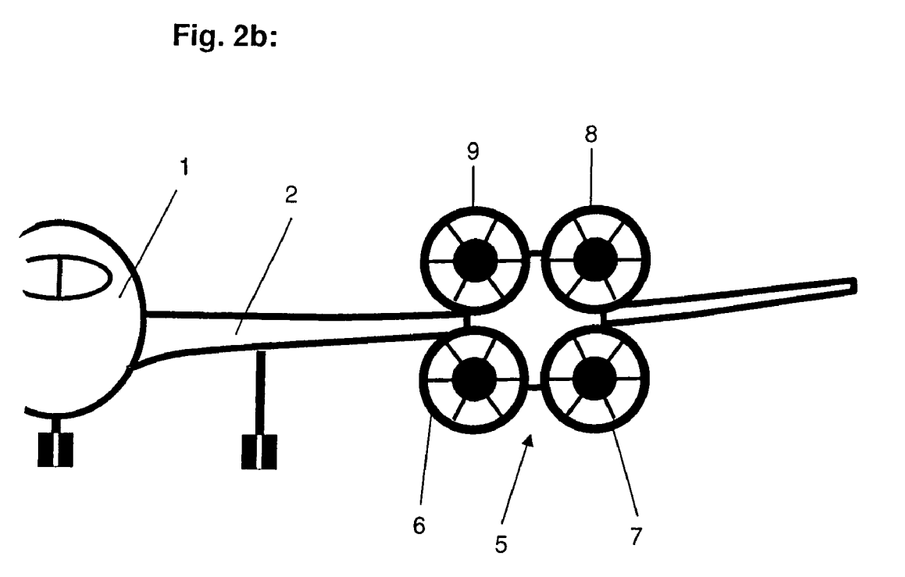
FIG. 2b shows a further aircraft propulsion unit in accordance with the present invention.

FIG. 2b, shows the right-hand half of an aircraft with an aircraft propulsion unit with a core engine 10 and four fan units or fans 6, 7, 8, 9 according to the present invention being arranged under the wing.

In accordance with the present invention, the aircraft propulsion units according to the present invention can, other than illustrated herein, also be arranged above the wing or on the fuselage.

Figure 3:
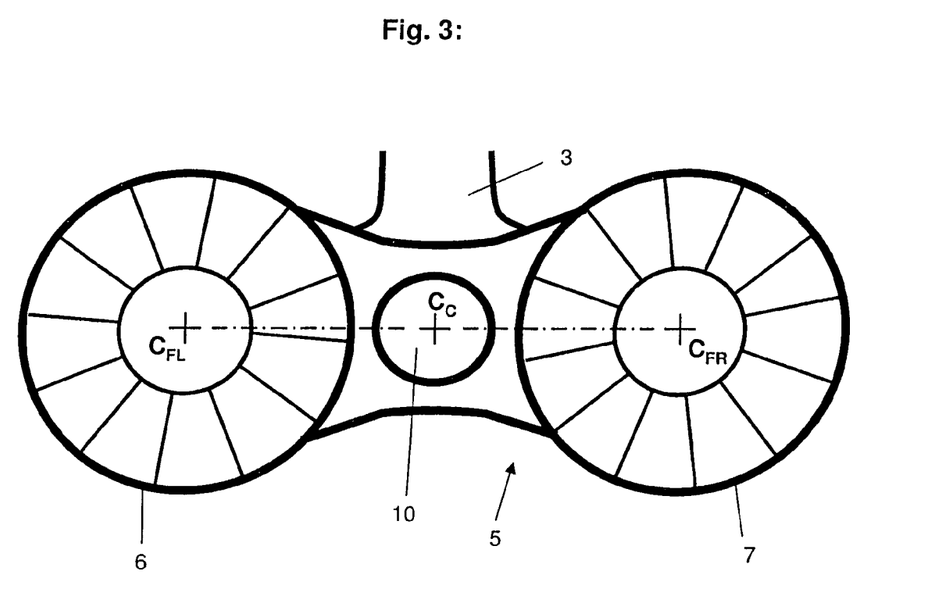
FIG. 3 shows a twin-fan aircraft propulsion unit, frontal view, in accordance with the present invention, with externally arranged centric ram inlet to the core engine.

FIG. 3 shows, in enlarged representation, an aircraft propulsion unit with twin fan according to the present invention, i.e. two fan units 6, 7 (fans) driven by the core engine 10. The rotary axis of the left-hand fan is marked CFL, the rotary axis of the right-hand fan CFR and the rotary axis of the core engine CC. In the configuration here shown CFL, CFR and CC form a straight line. Under certain circumstances it may be particularly advantageous that the core engine 10, as shown here, aspirates its air via a ram inlet arranged externally between the fan units (fans) 6, 7.

Figure 4:
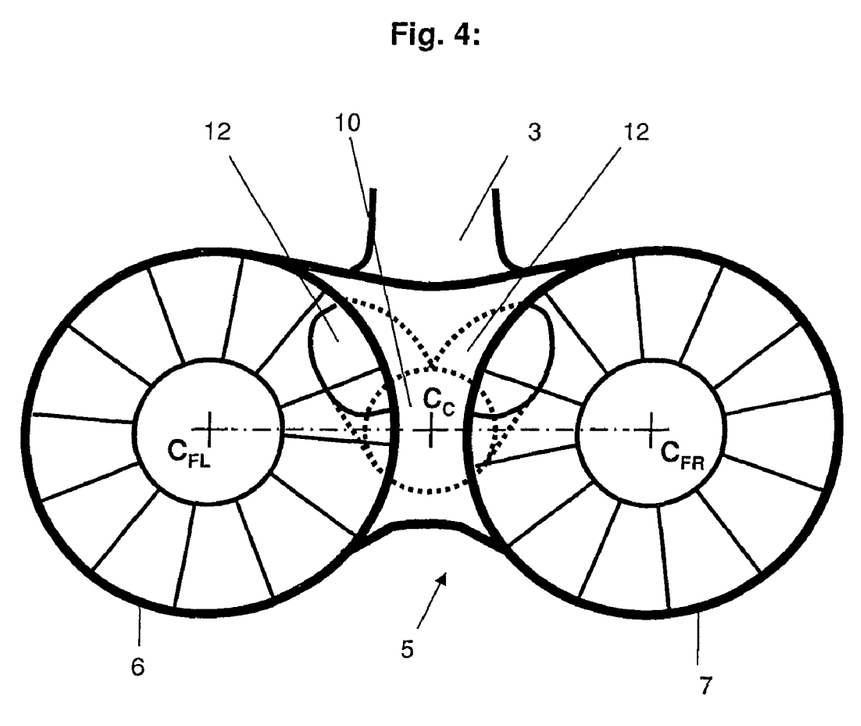
FIG. 4 shows a twin-fan aircraft propulsion unit, frontal view, in accordance with the present invention, with lateral ram inlets behind the fan to the core engine.

FIG. 4 shows, in enlarged representation, an aircraft propulsion unit with twin fan also in accordance with the present invention. Also here, the rotary axes CFL, CFR and CC form a straight line. However, provision is here made for the core engine 10 to aspirate its air via at least one ram inlet arranged on the periphery of the flow path of a fan unit (fan) 6, 7. From the ram inlet, the air is fed to the core engine 10 via a curved flow duct 12.

Figure 5A:
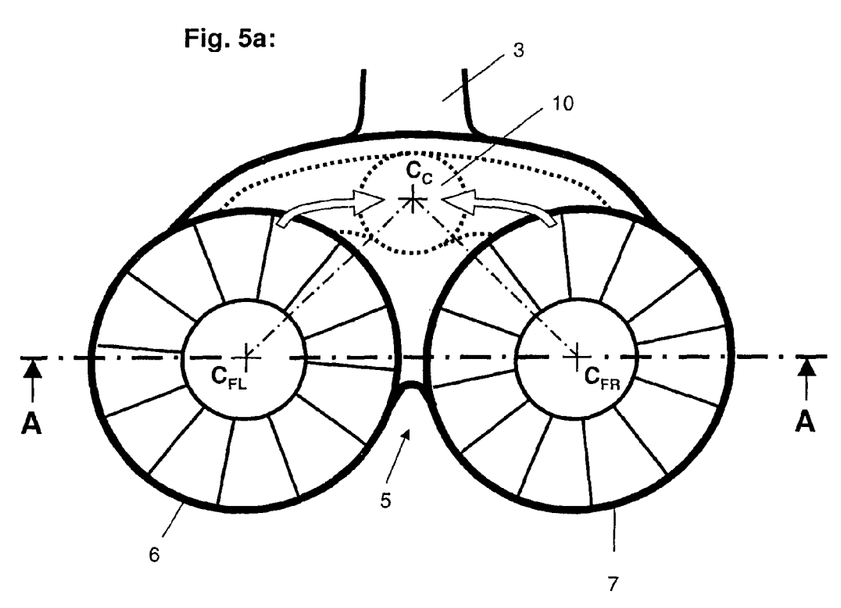
FIG. 5a shows a twin-fan aircraft propulsion unit, frontal view, in accordance with the present invention, with covered lateral inlets behind the fan to the core engine.

FIG. 5a shows, in enlarged representation, a further aircraft propulsion unit with twin fan according to the present invention. The rotary axes CFL, CFR are here equidistantly offset to the rotary axis CC. Accordingly, they establish an isosceles triangle. It is here provided that the core engine 10 aspirates its air via at least one inlet arranged as non-protruding opening on the periphery of the flow path of a fan unit (gearbox) 6, 7. From the inlet opening, the air is delivered to the core engine via a curved flow duct. This Figure furthermore defines the view A-A in which the solution according to the present invention is further detailed in the FIGS. 5b and 5c.

Figure 5B:
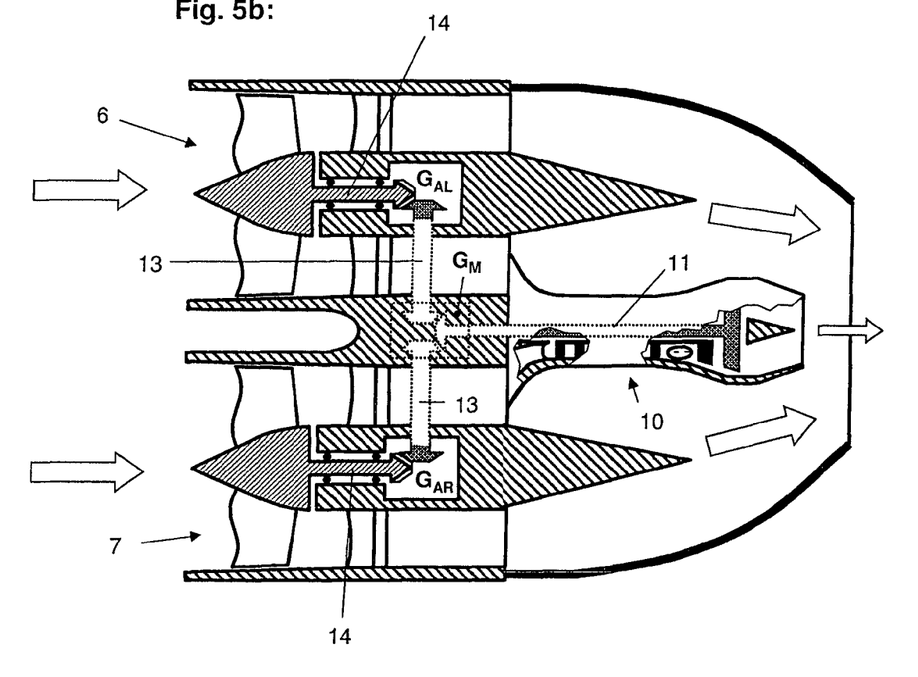
FIG. 5b shows a twin-fan aircraft propulsion unit, section A-A, in accordance with the present invention, with long nozzles and with the jets being united.

FIG. 5b shows the aircraft propulsion unit with twin-fan according to the present invention in section A-A which passes rectilinearly through the two axes of the fan units (gearboxes) 6, 7. The configuration of the fan units (gearboxes) 6, 7 with one rotor, one stator and one structural strut, as shown here, is only exemplary. Rather, any other configuration of blade rows enabling air to be delivered through the flow path of the fan units (gearboxes) 6, 7, including arrangements providing variability of rotor and stator blades, will also fall within the scope of the present invention. In the arrangement of the multi-fan propulsion unit here considered, the gas-turbine core engine is below, not in the sectional plane. For schematic illustration of its components, namely the compressor, the combustion chamber and the turbine, the casing is partly shown in cutaway view. The core engine is here shown in two-shaft configuration, with the shaft power being provided by a (separate) low-pressure turbine.

However, solutions by which the power is provided by a single-shaft or even three-shaft engine configuration having a larger or smaller number of compressors and/or turbines will also fall within the scope of the present invention.

Power is transmitted from the core engine 10 via the main shaft 11 to a central gearbox GM and distributed therein to two auxiliary shafts 13. The central gearbox GM, which is here schematically shown on the example of a bevel gearbox, can be designed such that, as viewed along the respective auxiliary shaft 13 to the central gearbox GM, a co-directional or counter-directional sense of rotation of at least two auxiliary shafts 13 is obtained.

Each auxiliary shaft 13 will transmit part of the core engine power to an auxiliary gearbox (here GAL and GAR) which, in turn, will transmit the power to the shaft 14 of the respective fan unit 6, 7.

Each auxiliary gearbox (GAL and GAR) can be designed such that clockwise or counter-clockwise direction of rotation of the respective drive shaft 14 of a fan unit 6, 7 is obtained when viewing the aircraft propulsion unit from front in the direction of flow. All gearboxes can be speed-increasing or speed-reducing. This enables the speed of the fan units 6, 7 to be ideally adapted to the demands of the thermodynamic engine process.

The fan units 6, 7 and the core engine 10 are joined to each other by means of a one-piece or multiple-piece frame structure made of metallic or light materials.

The gearboxes provided for power distribution are, in accordance with the present invention, also arranged in said frame structure.

As indicated by the big arrows, air flows from the left-hand side into the fan units and also into the core engine if the latter is provided with an external air inlet.

The air passes the fan units 6, 7 and is fed to a nozzle. As shown here, the flow duct of the nozzle can be provided in the form of an envelope surrounding the core engine 10. According to the present invention, the airflows of the fan units can here be mixed from a certain position before they are united with the hot-gas flow of the core engine or, separated by walls, fed to the nozzle exit.

Figure 5C:
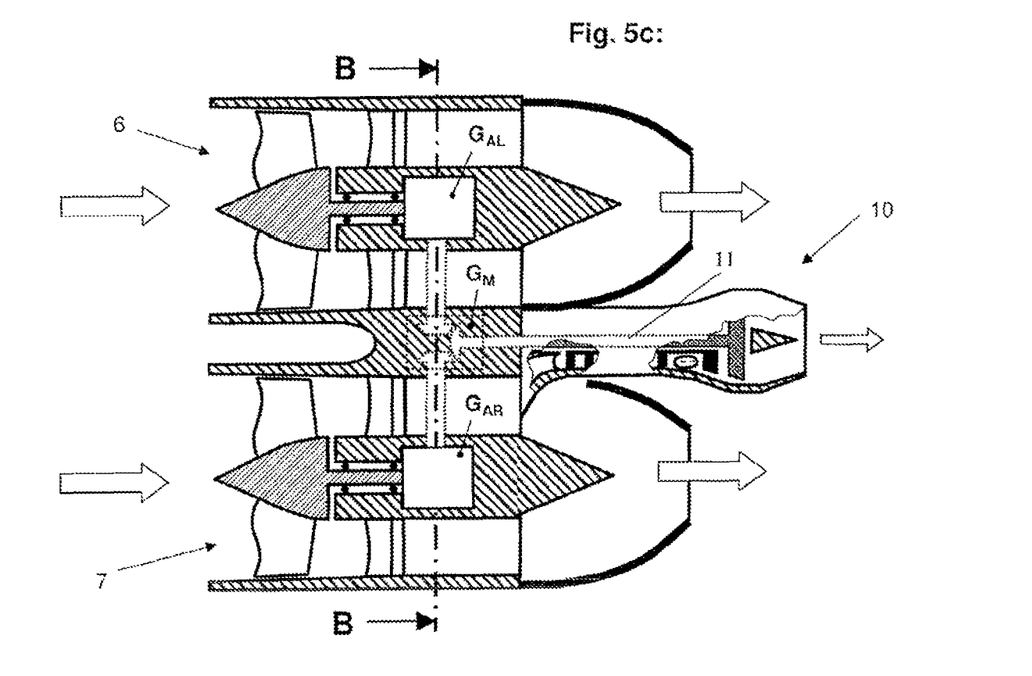
FIG. 5c shows a twin-fan aircraft propulsion unit, section A-A, in accordance with the present invention, with separate nozzles.

FIG. 5c shows, in section A-A, the aircraft propulsion unit with twin fan according to the present invention, now in a particularly favorable arrangement according to the present invention in which each fan unit has a separate exit nozzle. The airflows of the fan units 6, 7 here leave the engine without being united with each other or with the hot-gas flow.

Figure 5D:
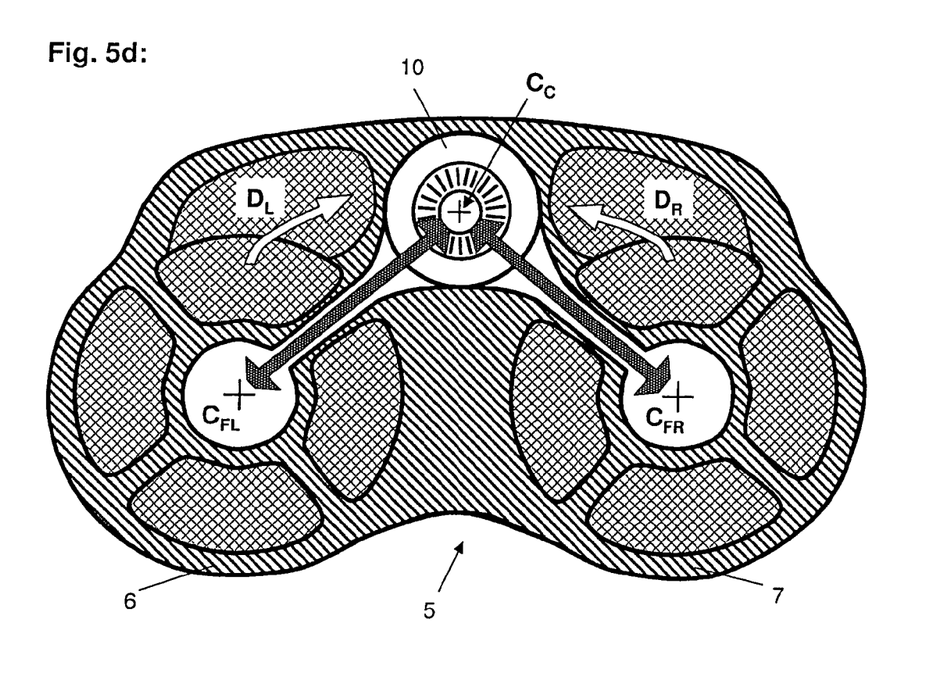
FIG. 5d shows a twin-fan aircraft propulsion unit, section B-B, in accordance with the present invention, with frame structure and drive shafts.

FIG. 5d shows the section B-B, as defined in FIG. 5c, through the aircraft propulsion unit with twin fan according to the present invention. The flow cross-sections of the two the fan units 6, 7 are indicated by the checkered areas. Through these, air flows into the drawing plane. Arranged above and centrally is the rotary axis CC of the core engine 10 which, however, is not yet visible in section B-B.

The core engine 10 in the configuration here shown, which is only one of the solutions falling within the scope of the present invention, is supplied with air via two transfer ducts DL and DR. The transfer ducts DL and DR tortuously pass through the frame structure, unite with each other further downstream of section B-B (below the drawing plane) and finally combine with the flow path of the core engine 10. In the example here illustrated, air is tapped via one opening each at the periphery of the flow path in the area between two struts of a fan unit 6, 7.

Schematically shown is the main shaft coming from the core engine 10 and the distribution of the driving power, via a gearbox, to the two auxiliary shafts 13, with each of the latter transmitting power to the drive shaft 14 (rotary axes CFL and CFR) of a fan unit 6, 7 via a further gearbox. Several struts hold the respective inner part of the frame structure in which the shaft and the rotor of the respective fan unit are located. The struts are here designed such that the auxiliary shafts can be passed through them.

The present invention can be described as follows:

An aircraft propulsion unit in multi-fan configuration,
with the required power being produced by a single gas-turbine core engine having at least one compressor, one combustion chamber and one turbine and with the power being provided at one of the two ends of the gas-turbine core engine at a rotating main shaft for driving several fan units, and optionally with one or more of the following:

and with the power provided at the main shaft being preferably split by a gearbox (central gearbox) to at least two auxiliary shafts, with partial power being transmitted by each of the auxiliary shafts via a further gearbox (auxiliary gearbox) to the drive shaft of a fan unit, and with the at least two fan units and the gas-turbine core engine being joined to each other by a one-piece or multiple-piece common frame structure, thus forming a compact aircraft propulsion unit, with each fan unit having at least one row of rotor blades or also at least two counter-rotating rotor blade rows and being of single-flow or also multi-flow configuration, and with at least one of the gearboxes required for power distribution being provided within said frame structure, and with the central gearbox being designed such that co-rotation of at least two auxiliary shafts is obtained when viewing the individual auxiliary shafts along their axis towards the central gearbox, and with the central gearbox being designed such that counter-rotation of at least two auxiliary shafts is obtained when viewing the individual auxiliary shafts along their axis towards the central gearbox, and with the individual auxiliary gearboxes being designed such that counter-rotation of at least two fan drive shafts is obtained when viewing the aircraft propulsion unit from front in the direction of flow, and with the individual auxiliary gearboxes being designed such that co-rotation of at least two fan drive shafts is obtained when viewing the aircraft propulsion unit from front in the direction of flow, and with the multi-fan aircraft propulsion unit, owing to its design, being installable on the aircraft without extensive integration into the wing or the fuselage, and with the centers of the rotary axes of the fan units being essentially equidistantly offset from the center of the rotary axis of the gas-turbine core engine, and with the centers of the rotary axes of the fan units and of the gas-turbine core engine forming a straight line, and with the air for the gas-turbine core engine being fed via an external ram inlet arranged between the fan units and delivered to the inlet of the gas-turbine core engine via a duct, and with the air for the gas-turbine core engine being tapped in the interior of at least one fan unit downstream of a rotor or stator blade row via at least one opening on the flow path and fed through a curved duct to the inlet of the gas-turbine core engine, and with the air for the gas-turbine core engine being tapped via at least one opening on elements arranged in the flow path, such as stator blades or struts, and being fed through a curved duct to the inlet of the gas-turbine core engine, and with the airflow, upon passing a fan unit, reaching the environment via a separate nozzle, and with the nozzle being essentially concentric with the fan axis, and with the airflow, upon passing a fan unit, being forwarded through a duct along the gas-turbine core engine, with the airflow at least partly enveloping the gas-turbine core engine, and with the exit airflows of at least two fan units being united in the environment of the gas-turbine core engine, and with the exit airflows of at least two fan units being passed along the gas-turbine core engine separated by walls, and with the exit airflows being passed along the gas-turbine core engine to a position where they can be mixed with the hot-gas flow of the gas-turbine core engine.

The multi-fan aircraft propulsion unit specified in the present invention enables a hitherto unequalled bypass ratio and a correspondingly high propulsion to be achieved. The specific fuel consumption of the engine is reduced by approx. 20 percent.

LIST OF REFERENCE NUMERALS

1 Fuselage
2 Wing
3 Strut
4 Engine
5 Aircraft propulsion unit
6-9 Fan
10 Gas-turbine core engine
11 Main shaft
12 Curved flow duct
13 Auxiliary shaft
14 Shaft

What is claimed is:

1. An aircraft propulsion unit, comprising:
a gas-turbine core engine having at least one compressor, one combustion chamber and one turbine driving a main shaft, the gas-turbine core engine having a central core axis;
at least two separate fan units, each having a rotating fan rotating about a central fan axis of the fan unit and a primary downstream flow path directly downstream of the rotating fan;
a common casing structure for the gas-turbine core engine and the at least two separate fan units, the common casing structure including an outer casing surrounding each rotating fan of the at least two separate fan units to form an outer periphery of the primary downstream flow path for each of the at least two separate fan units;
a mechanical drive connection operationally connecting the at least two separate fan units to the main shaft, the central fan axis of each of the at least two separate fan units being laterally offset from the central core axis of the gas-turbine core engine; and
for at least one of the two separate fan units, at least one air inlet for the core engine having an opening to the primary downstream flow path positioned behind the rotating fan of the fan unit in the outer casing forming the outer periphery of the primary downstream flow path so as not to protrude into the primary downstream flow path.

2. The aircraft propulsion unit of claim 1, and further comprising a central gearbox for distributing the power provided by the gas-turbine core engine to the at least two separate fan units, at least two auxiliary shafts driven by the central gearbox, and an auxiliary gearbox for transmitting partial power to a drive shaft of a fan unit via each of the auxiliary shafts.

3. The aircraft propulsion unit of claim 2, and further comprising a common frame structure connecting each of the at least two separate fan units and the gas-turbine core engine.

4. The aircraft propulsion unit of claim 2, wherein each of the at least two separate fan units includes at least one row of rotor blades and is of single-flow or multi-flow configuration.

5. The aircraft propulsion unit of claim 3, wherein at least one of the gearboxes required for power distribution is positioned within the frame structure.

6. The aircraft propulsion unit of claim 2, wherein the central gearbox is configured such that, when viewing the individual auxiliary shafts along their axes towards the central gearbox, a co-directional rotation of at least two auxiliary shafts is obtained.

7. The aircraft propulsion unit of claim 2, wherein the central gearbox is configured such that, when viewing the individual auxiliary shafts along their axes towards the central gearbox, a counter-directional rotation of at least two auxiliary shafts is obtained.

8. The aircraft propulsion unit of claim 2, wherein the individual auxiliary gearboxes are configured such that a counter-directional sense of rotation of at least two fan drive shafts is obtained, when viewing the aircraft propulsion unit from a front in a direction of flow.

9. The aircraft propulsion unit of claim 2, wherein the individual auxiliary gearboxes are configured such that a co-directional sense of rotation of at least two fan drive shafts is obtained, when viewing the aircraft propulsion unit from a front in a direction of flow.

10. The aircraft propulsion unit of claim 2, wherein centers of rotational axes of the at least two separate fan units are essentially equidistantly offset from a center of a rotary axis of the gas-turbine core engine.

11. The aircraft propulsion unit of claim 2, wherein centers of rotational axes of the at least two separate fan units and of the gas-turbine core engine form a straight line.

12. The aircraft propulsion unit of claim 2, and further comprising an external ram inlet arranged between the at least two separate fan units and a duct connected between the external ram inlet and an inlet of the gas-turbine core engine for supplying air to the gas-turbine core engine.

13. The aircraft propulsion unit of claim 2, wherein the air inlet further comprises a curved duct connected between the opening and an inlet of the gas-turbine core engine for supplying air to the gas-turbine core engine.

14. The aircraft propulsion unit of claim 2, and further comprising a separate nozzle by which an airflow, upon passing a fan unit reaches the environment.

15. The aircraft propulsion unit of claim 14, wherein the nozzle is essentially concentric with the central fan axis of the fan unit.

16. The aircraft propulsion unit of claim 2, and further comprising a duct via which an airflow, upon passing a fan unit is forwarded along the gas-turbine core engine, with the airflow at least partly enveloping the gas-turbine core engine.

17. The aircraft propulsion unit of claim 2, wherein exit airflows of at least two fan units are united in an area of the gas-turbine core engine.

18. The aircraft propulsion unit of claim 2, and further comprising walls separating exit airflows of at least two fan units as they pass along the gas-turbine core engine.

19. The aircraft propulsion unit of claim 17, wherein the exit airflows are passed along the gas-turbine core engine to a position where they are mixed with the hot-gas flow of the gas-turbine core engine.

* * * * *